US010601832B1

(12) United States Patent
Pajjuri et al.

(10) Patent No.: US 10,601,832 B1
(45) Date of Patent: Mar. 24, 2020

(54) PROXY CAPTIVE PORTAL TRAFFIC FOR INPUT-LIMITED DEVICES

(71) Applicant: Amazon Technologies, Inc., Seattle, WA (US)

(72) Inventors: Ambika Pajjuri, Palo Alto, CA (US); Soniya Jobanputra, Menlo Park, CA (US); David Pathakjee, Seattle, WA (US); Thomas Daniel Mueller, Seattle, WA (US); Ezekiel Wade Sanborn de Asis, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 15/085,088

(22) Filed: Mar. 30, 2016

(51) Int. Cl.
*H04L 29/06* (2006.01)

(52) U.S. Cl.
CPC .............. *H04L 63/10* (2013.01); *H04L 63/08* (2013.01)

(58) Field of Classification Search
CPC ........................... H04L 63/10; H04L 63/0892
USPC .................................. 713/150–155; 726/2–7
See application file for complete search history.

(56) References Cited

U.S. PATENT DOCUMENTS

| | | | | |
|---|---|---|---|---|
| 9,332,054 B2* | 5/2016 | Wilson | ..................... | H04L 63/08 |
| 9,398,007 B1* | 7/2016 | Wegener | ................ | H04W 12/06 |
| 9,549,152 B1* | 1/2017 | Nayyar | .................. | H04N 7/148 |
| 9,609,067 B2* | 3/2017 | Mobarak | ................ | H04L 67/141 |
| 9,853,943 B2* | 12/2017 | Martini | ................ | H04L 63/0471 |
| 9,900,162 B2* | 2/2018 | Woxland | ................ | H04L 9/3263 |
| 10,148,495 B1* | 12/2018 | Oczkowski | ............ | H04W 12/06 |
| 2007/0067625 A1* | 3/2007 | Jiang | ........................ | H04L 63/10 713/168 |
| 2013/0268666 A1* | 10/2013 | Wilson | ..................... | H04L 67/02 709/225 |
| 2013/0286889 A1* | 10/2013 | Cherian | .................. | H04L 63/18 370/254 |
| 2013/0298209 A1* | 11/2013 | Targali | ................ | H04L 63/0815 726/6 |
| 2014/0068030 A1 | 3/2014 | Chambers et al. | | |
| 2014/0153577 A1 | 6/2014 | Janakiraman et al. | | |
| 2014/0189808 A1* | 7/2014 | Mahaffey | ............... | H04L 63/083 726/4 |
| 2015/0012970 A1* | 1/2015 | Toksvig | .................. | G06F 21/41 726/3 |
| 2015/0071216 A1* | 3/2015 | Ilsar | ...................... | H04W 48/12 370/329 |
| 2015/0089592 A1 | 3/2015 | Han et al. | | |
| 2015/0142947 A1* | 5/2015 | Dyba | ....................... | H04L 67/34 709/224 |
| 2015/0146706 A1* | 5/2015 | Goluboff | ............... | H04W 76/10 370/338 |

(Continued)

*Primary Examiner* — Lynn D Feild
*Assistant Examiner* — Viral S Lakhia
(74) *Attorney, Agent, or Firm* — Pierce Atwood LLP

(57) ABSTRACT

A system for re-registering an input-limited device, such as a voice-enabled device, with a captive portal access point that requires completion of a portal webpage prior to allowing client devices access to a network, such as the Internet, is described. Such captive portal access points are commonly found in hotels, and may be used for both freely provided public WiFi and for connections that require providing payment. For re-registration of the input-limited device with the captive portal access point, a server may send a notification to a mobile computing device associated with the input-limited device.

16 Claims, 13 Drawing Sheets

(56) References Cited

U.S. PATENT DOCUMENTS

| | | | |
|---|---|---|---|
| 2015/0189547 A1* | 7/2015 | Forssell | H04L 63/101 370/235 |
| 2015/0201438 A1 | 7/2015 | Adarapu et al. | |
| 2015/0295885 A1 | 10/2015 | Congdon et al. | |
| 2016/0014660 A1 | 1/2016 | Bar et al. | |
| 2016/0066355 A1* | 3/2016 | Chakraborty | H04W 4/21 726/3 |
| 2016/0112262 A1* | 4/2016 | Johnson | G06F 9/45504 709/221 |
| 2016/0156719 A1* | 6/2016 | Mobarak | H04L 67/141 726/4 |
| 2016/0226849 A1 | 8/2016 | Fan et al. | |
| 2016/0234678 A1* | 8/2016 | Baum | H04W 48/08 |
| 2016/0249213 A1 | 8/2016 | Wong et al. | |
| 2016/0344745 A1* | 11/2016 | Johnson | H04L 67/34 |
| 2017/0034160 A1* | 2/2017 | Brands | H04L 63/0861 |
| 2017/0048373 A1* | 2/2017 | Dees | H04L 12/2809 |
| 2017/0118210 A1* | 4/2017 | Athias | H04L 63/0876 |
| 2017/0171318 A1 | 6/2017 | Levithan | |
| 2017/0257819 A1* | 9/2017 | McCann | H04W 48/14 |

* cited by examiner

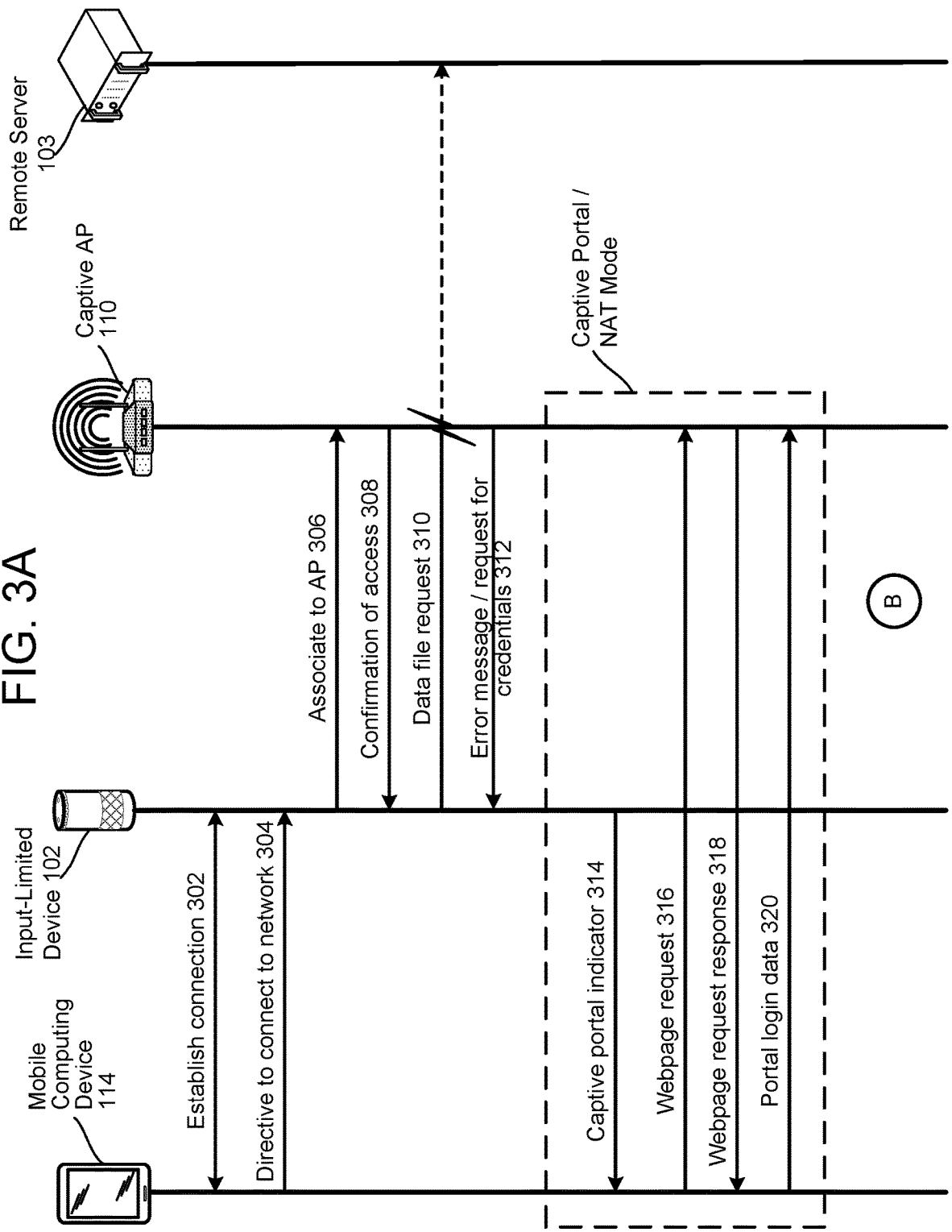

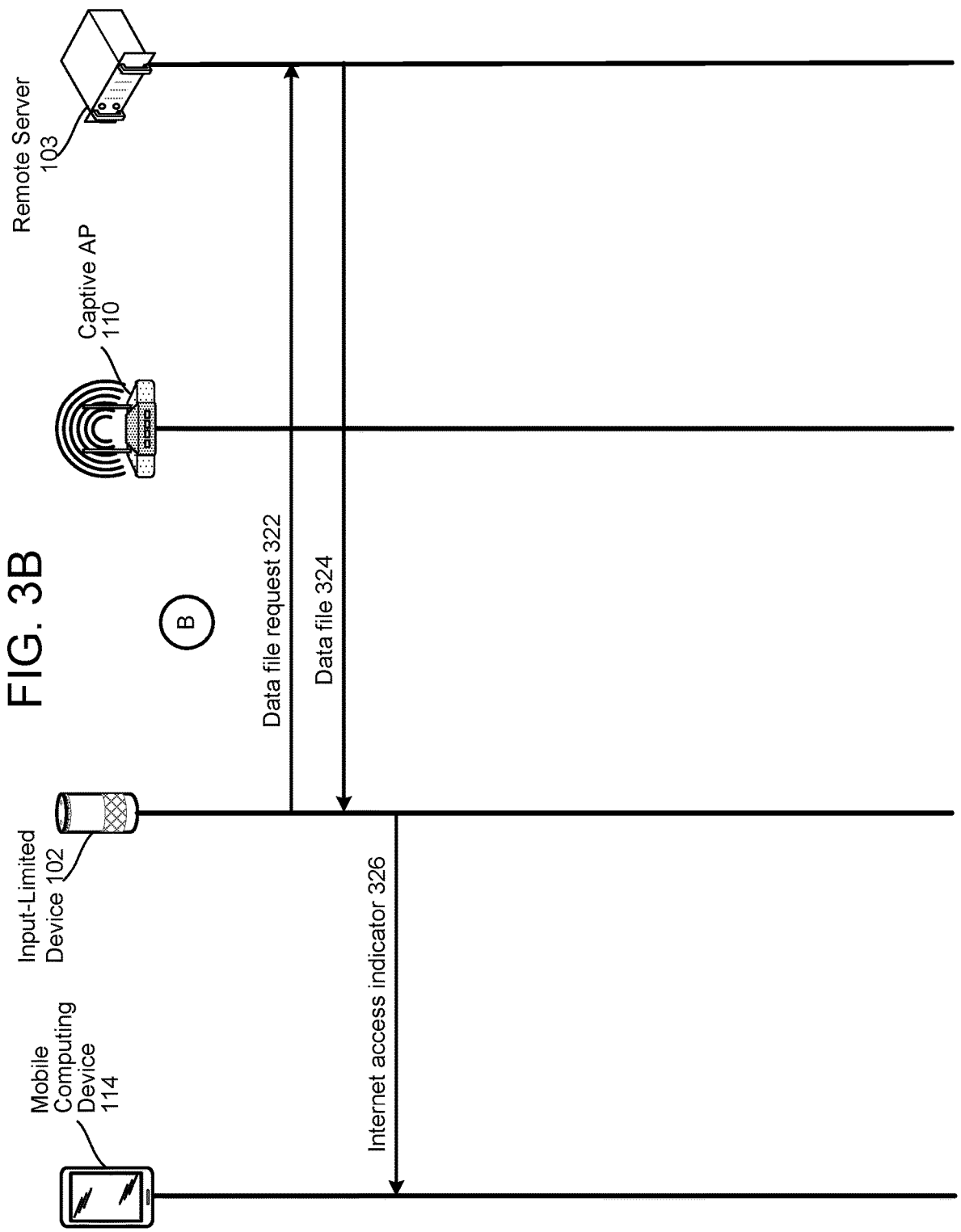

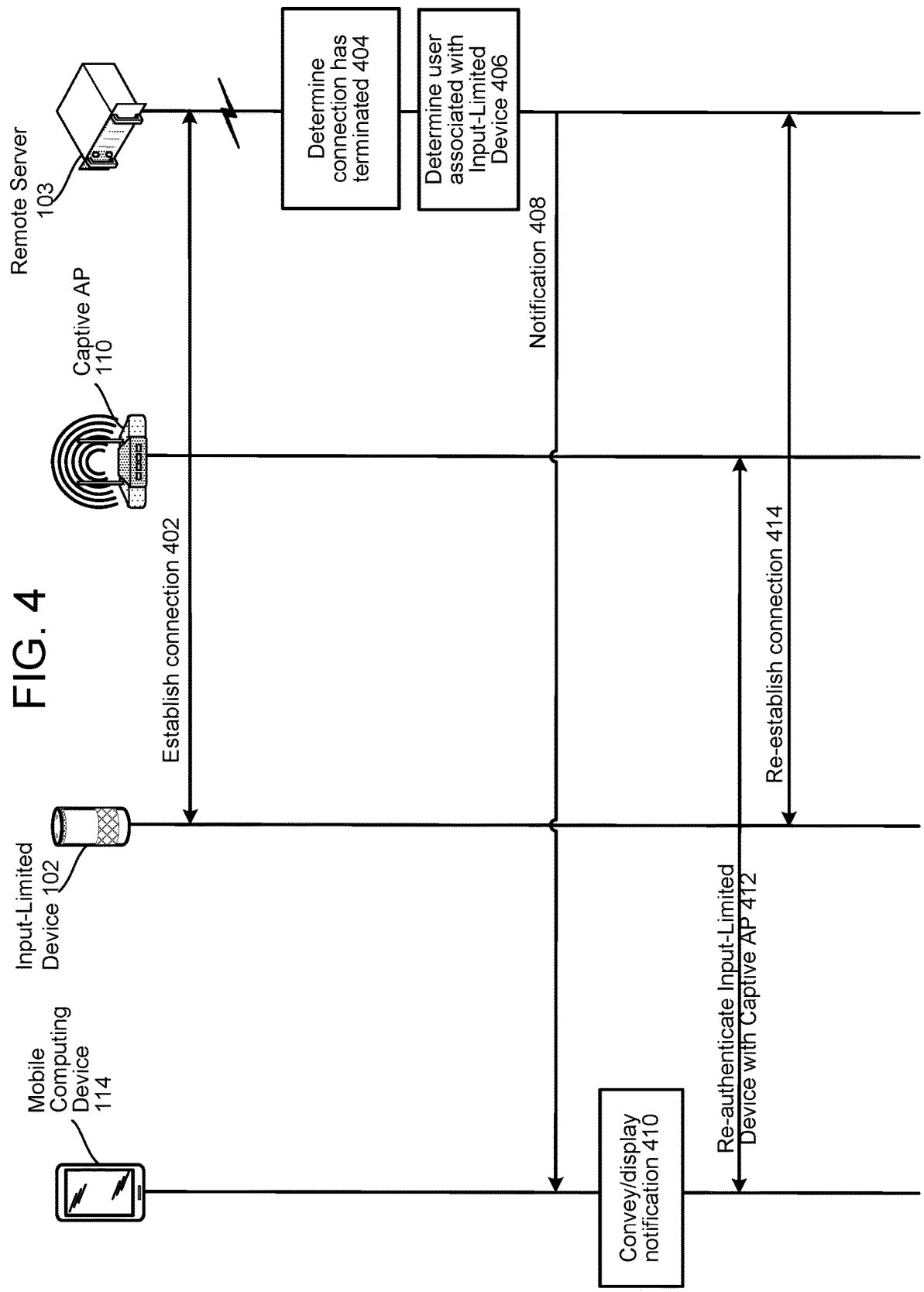

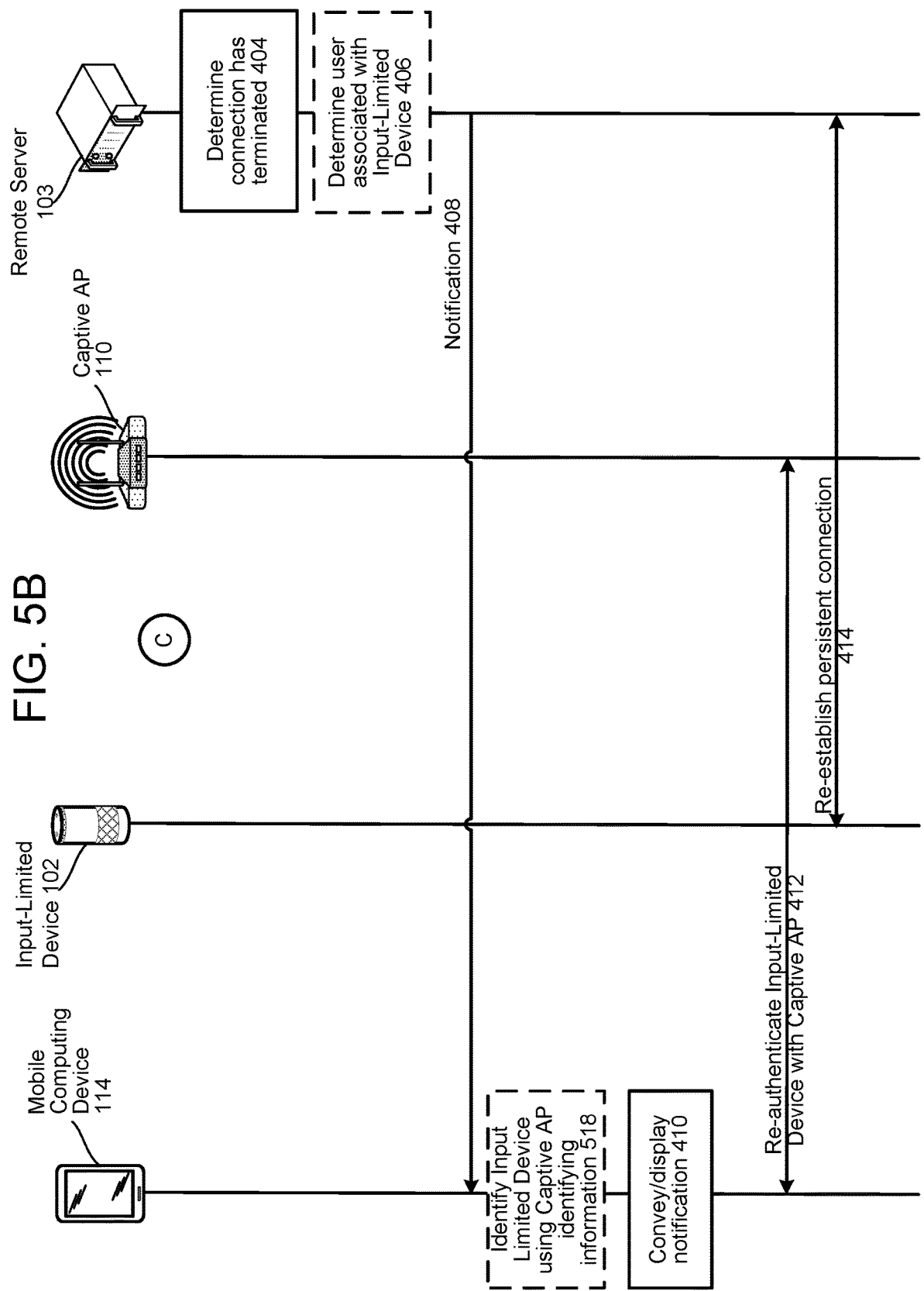

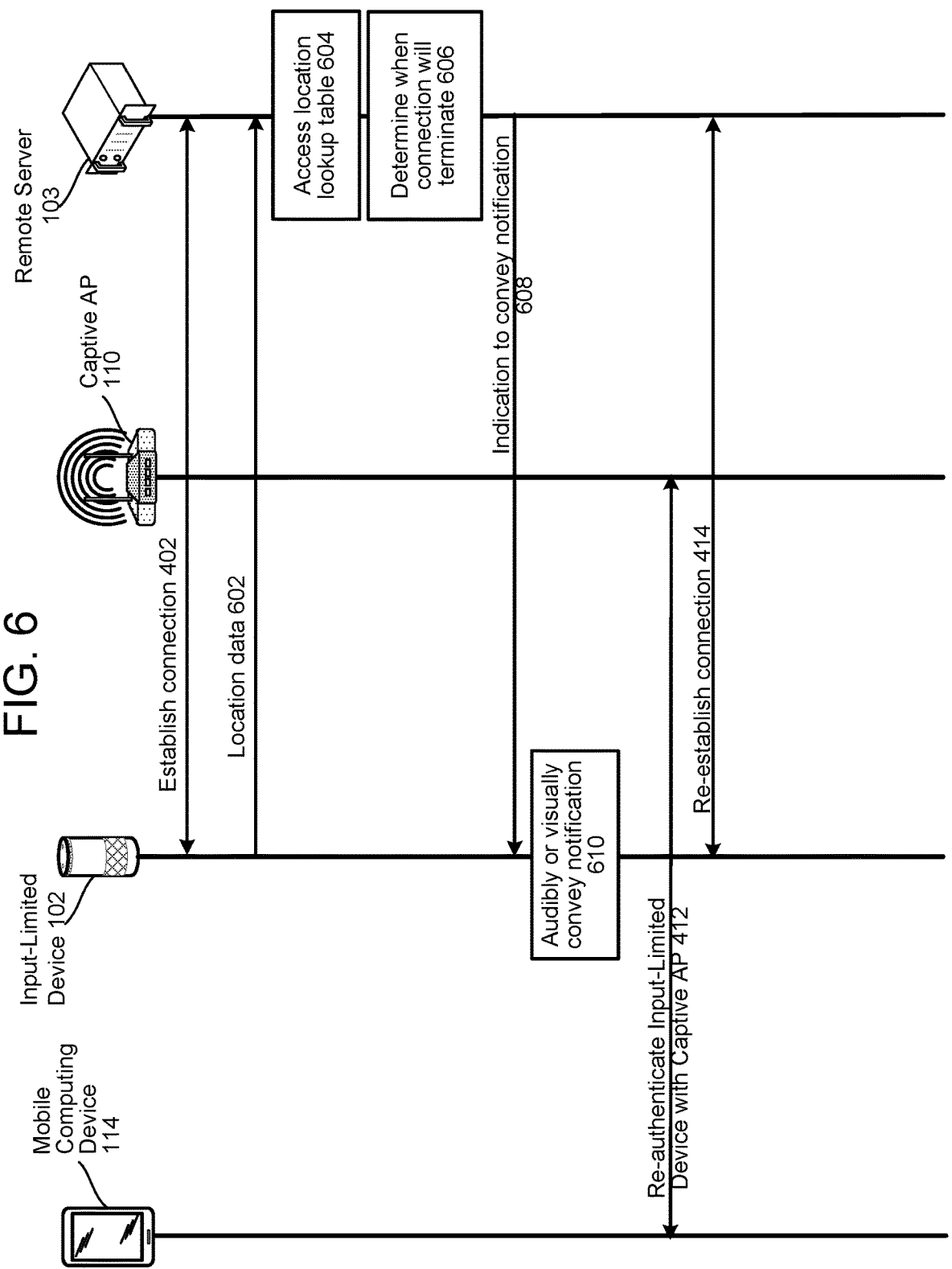

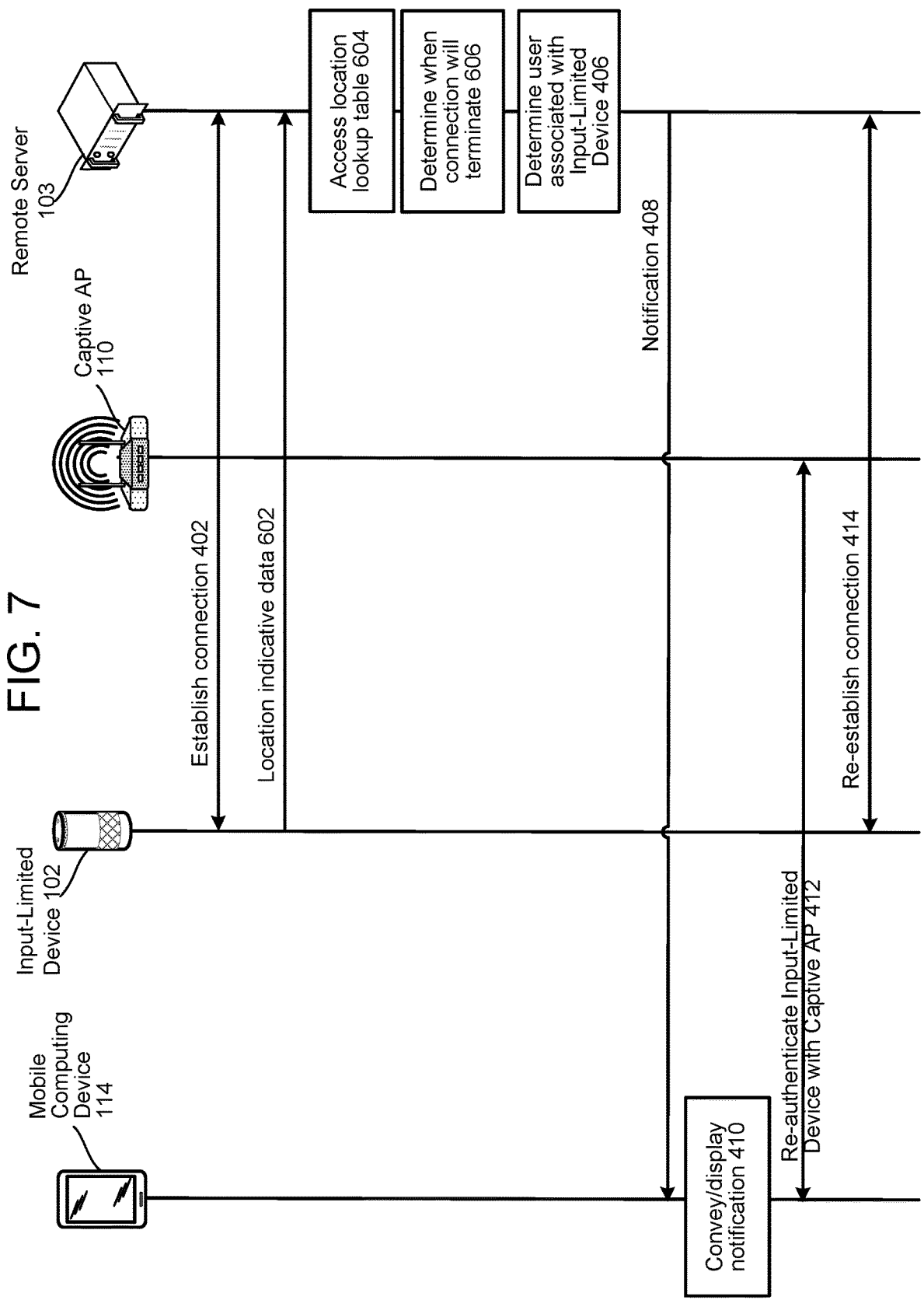

US 10,601,832 B1

PROXY CAPTIVE PORTAL TRAFFIC FOR INPUT-LIMITED DEVICES

BACKGROUND

Consumer electronics devices are capable of connecting to data servers over the Internet and retrieve data files on demand. Electronic devices come in a variety of forms, including "headless" devices which may not have certain input/output components such as a display, keyboard, touchscreen, etc.

BRIEF DESCRIPTION OF DRAWINGS

For a more complete understanding of the present disclosure, reference is now made to the following description taken in conjunction with the accompanying drawings.

FIGS. 3A and 3B are a signal flow diagram based on the processes in FIGS. 2A and 2B.

FIG. 4 is a signal flow diagram illustrating re-authentication of an input-limited device to a captive portal.

FIGS. 5A and 5B are a signal flow diagram illustrating re-authentication of an input-limited device to a captive portal.

FIG. 6 is a signal flow diagram illustrating re-authentication of an input-limited device to a captive portal.

FIG. 7 is a signal flow diagram illustrating re-authentication of an input-limited device to a captive portal.

DETAILED DESCRIPTION

Figure 1:
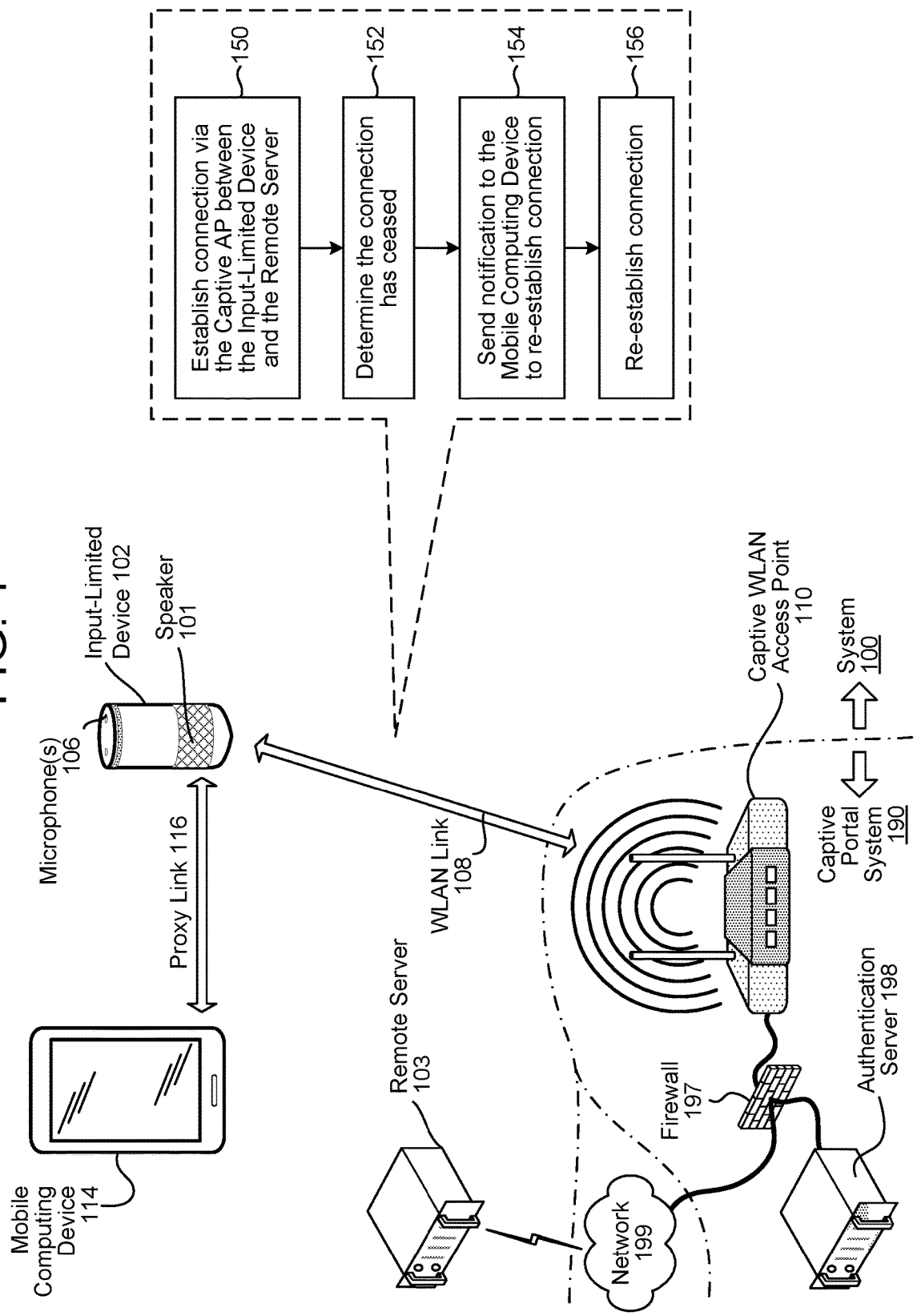
FIG. 1 illustrates a system for sharing login credentials with a device attempting to access a captive network access point.

Certain electronic devices may have limited user interface capabilities for entry of text information. For example, a "headless," voice-enabled device may lack an alphanumeric keyboard supporting single-keystroke direct user input of text characters for text entry. Text entry is sometimes needed, such as when a user of a headless or otherwise input/output limited device must enter login credentials (e.g., user name and password), accept terms of use, or otherwise provide information to join a (secure) wireless access point (e.g., a wireless local area network (WLAN) access point such as a WiFi access point).

Another scheme is to have the wireless computing device login to the secure access point and then upload the credentials to-be-shared to a server in the "cloud." Other devices then connect to the server to acquire the credentials using a secondary network, such as a cellular telephony data network.

However, these credential sharing schemes fail when the access point is a captive portal. Unlike secure access points that require credentials to connect, captive portal access points are typically "open," and allow a client device to connect without credentials. However, after connecting, the captive portal access point may force a connecting client device to display a special webpage that a user must complete to acquire network access privileges.

The webpage may be used for authentication purposes, and may require a new user to accept terms-of-service, provide login credentials, and/or provide a method of payment to gain network access. Until the user completes portal registration through the webpage, access to the network beyond the captive portal access point is limited or blocked. Captive portals are commonly deployed at hotels and used by public WiFi "hotspots."

Captive portal standards have not been widely accepted. Captive portal implementations tend to be ad hoc, providing inconsistent protocol-level support and limiting the ability of software and hardware developers to automate the registration process. Besides not being compatible with the credential sharing schemes used with secure access points, captive portals can be an insurmountable hurdle for screenless devices or other devices that lack web browsers. Without a web browser, the portal webpage provided by the captive portal access point cannot be displayed nor completed by a user of the device, even if credentials are acquired from another device. Further, because many devices rely on Internet access to perform speech recognition operations needed to operate the device, the device may effectively be inoperable (save for a few functions such as setup, etc.) until full Internet access is enabled. Unless the device is able to tether to a network through another device (e.g., connecting to the Internet by relaying data through a smart phone, which itself may have access to the Internet through the captive portal access point), a device that lacks a web browser will be unable to access remote data.

Overcoming the obstacles posed by captive portals, FIG. 1 illustrates a system 100 where an input-limited device 102 forwards and masks data provided by a mobile computing device 114 so the device 102 can become registered to a captive portal system 190. A mobile computing device 114 is used to respond to a portal webpage and register the device 102 with the captive portal system 190, providing the device 102 access to an outside network 199 such as the Internet.

The device 102 may be an input/output-limited device. For example, the device 102 may lack a screen, keyboard, etc. In another example, the device 102 may include a display that has limited input (e.g., a device that uses a remote control). In a further example, the device 102 may be a device with a low resolution or small screen, incapable of displaying a webpage needed to gain Internet access through a captive portal.

When the device 102 acts as an intermediary between the mobile computing device 114 and a captive portal access point (AP) 110 of the captive portal system 190, the device 102 is serving as a proxy for purposes of registration to a captive portal system 190. In computer networking, a "proxy" functions as a bridge between two devices, passing on data and requests from one device to the other. When a proxy forwards data packets from one device to the other, it may substitute its own media access control (MAC) address (a unique device identifier discussed further below), and replaces any information about the origin of the packets in the packet headers to identify itself as being the packet's point-of-origin (in effect, shielding a device on one side of the proxy from seeing another device on the other side of the proxy). A "captive" access point is a wired or wireless network access point that requires login via a web browser prior to granting network access privileges. A "portal" is a webpage that is used to authenticate user credentials, get a user to accept terms, and/or to get user payment information, prior to granting a client device access to the network 199 (e.g., the Internet).

The device 102 is an example of an "input-limited" device. An input-limited device is a device which does not have rich user input capabilities (e.g., a device lacking a physical alphanumeric keyboard, and/or lacking a touch interface allowing direct interaction with a virtual alphanumeric keyboard, such that there is no provision for direct single-keystroke entry of alphanumeric text characters). While the teachings herein may apply to certain voice-enabled devices as an example of an input/output-limited device, the principles and examples described herein apply to any device, whether input/output-limited or not. Although the examples describe the captive portal access point 110 as being to a wireless network, the principles of operation also apply to wired networks, such as an Ethernet gateway, where a client device is presented with a portal webpage that must be completed in order to access a network through the captive gateway. In any event, whichever communication interface is originally used, that communication interface is used to perform subsequent operations. For example, if the original network accessed is a wireless network, the operations performed by the devices herein may be performed using only wireless communication interfaces. Alternatively, if the original network accessed is a wired network the operations performed by the devices may be performed using only wired communication interfaces.

Captive portals systems (illustrated as 190) may record the media access control (MAC) address of connecting devices. Devices registered through the portal are recognized by their MAC address, and are allowed to access the network 199 (e.g., the Internet) beyond the firewall 197. A MAC address is a unique identifier assigned to network interfaces of a device for communication purposes. MAC addresses are used as a network address/name for most IEEE 802 network technologies, including WiFi and Ethernet. MAC addresses are usually fixedly assigned by the manufacturer of a network interface controller (NIC) and are stored in its hardware. By having the device 102 serve as a proxy, interactions with the captive portal access point 110 during registration, even if they originate from the mobile computing device 114, appear to originate from the MAC address of the device 102, not the mobile computing device 114.

Devices with MAC addresses that are not associated with registered devices are directed by a firewall 197 to the portal, which may be provided by an authentication server 198. A typical captive portal setup is to have a firewall 197 intercept network packets from an unregistered client device until the device registers with the authentication server 198. Depending upon the network protocols supported, the authentication server 198 may cause an unregistered device to launch a web browser by pushing a portal webpage to the unregistered device, or the captured portal system may wait until the unregistered device attempts to access an address via the network 199 (e.g., attempts to access a uniform resource locator), at which point the firewall 197 redirects the web browser to the portal on the authentication server 198 for registration. Such techniques are sometimes referred to as Universal Access Method (UAM) in implementation and standards forums.

Although a captive portal system 190 comprising a captive portal access point 110, a firewall 197, and an authentication server 198 are illustrated in FIG. 1, the architecture of the captive portal system 190 is outside of the scope of the present disclosure, and is illustrated purely for explanatory purposes. In some implementations, the firewall 197 and the authentication server 198 are combined. In other implementations, the firewall 197 and the captive portal access point 110 are combined. In any case, the system 100 is intended to operate with any captive portal architecture where a portal webpage must be completed in order to unlock network access.

The mobile computing device 114 may connect the device 102 to the internet through the captive portal system 190 during a regular set-up process between the mobile computing device 114 and the device 102. For example, if, during a regular setup process the mobile computing device 114 and/or the device 102 determines that the accessed network is serviced by a captive portal, the device(s) may enter the captive portal access process discussed herein. For present purposes, the focus of the description will be on the captive portal access process, but it should be understood that the methods and systems described below may also be used as part of other connection/setup procedures.

As illustrated in FIG. 1, the device 102 establishes a connection with a remote server 103 via the captive portal access point (illustrated as 150). As will be described further below, accessing of the captive portal access point 110 using the WLAN link 108 may be the result of a user selecting an access point within range from a list displayed on the mobile computing device 114, or may be in response to a directive from the mobile computing device 114 that directs the device 102 where to connect via the peer-to-peer proxy link 116.

It may be beneficial for the server 103 to know the device 102 is an input-limited device. For example, the device 102 may send data to the server 103 indicating the device 102 is an input-limited device. In another example, the server 103 may determine the device 102 is an input-limited device by accessing a lookup table (LUT) according to the device's product number, or some other data.

It may also be beneficial for the server 103 to know it is connected to the device 102 via a captive portal access point. As such, the device 102 may send the server 103 information stating the access point is captive. Alternatively, the server 103 may independently determine the access point is captive. For example, the server 103 may determine the access point is captive after receiving an error message in response to attempting to send the device 102 data.

At some time after the connection is established, it is determined that the connection has terminated/ceased (illustrated as 152). In response, a notification (e.g., "card") is sent to the mobile computing device 114 (illustrated as 154). In an example, the notification may be audible and may simply state "Device 102 has lost connection, please reconnect the device 102 to the Internet." In some examples, the notification indicates that the device 102 needs to be reconnected to the captive portal access point 110 (i.e., the connection has to be re-authenticated). The mobile computing device 114 and the device 102 then under captive portal access point 110 connection processes as described herein (illustrated as 156).

Figure 2A:
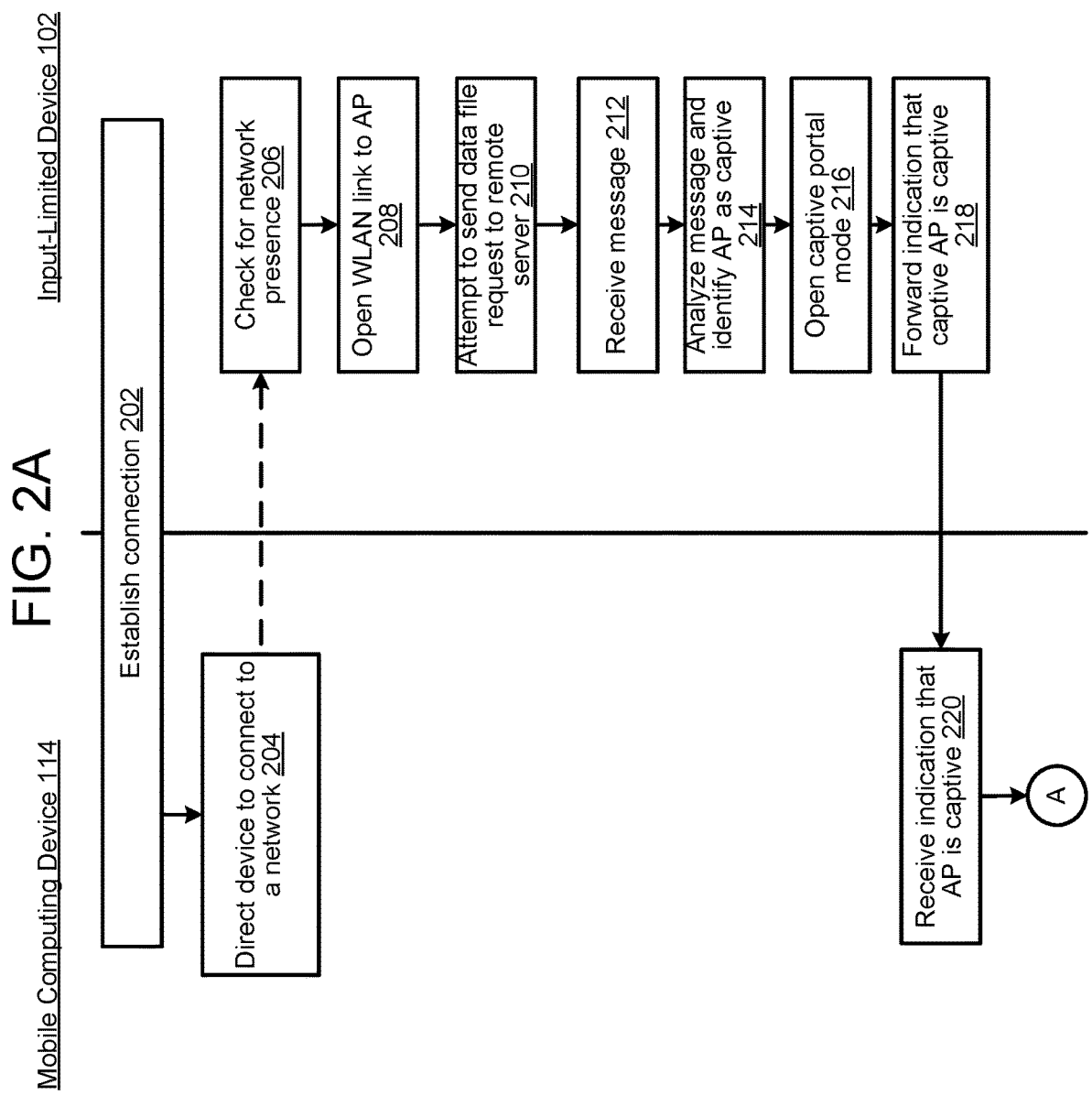
FIGS. 2A and 2B illustrate an example of a process for sharing portal login credentials between an input-limited device and a mobile computing device.
Figure 2B:
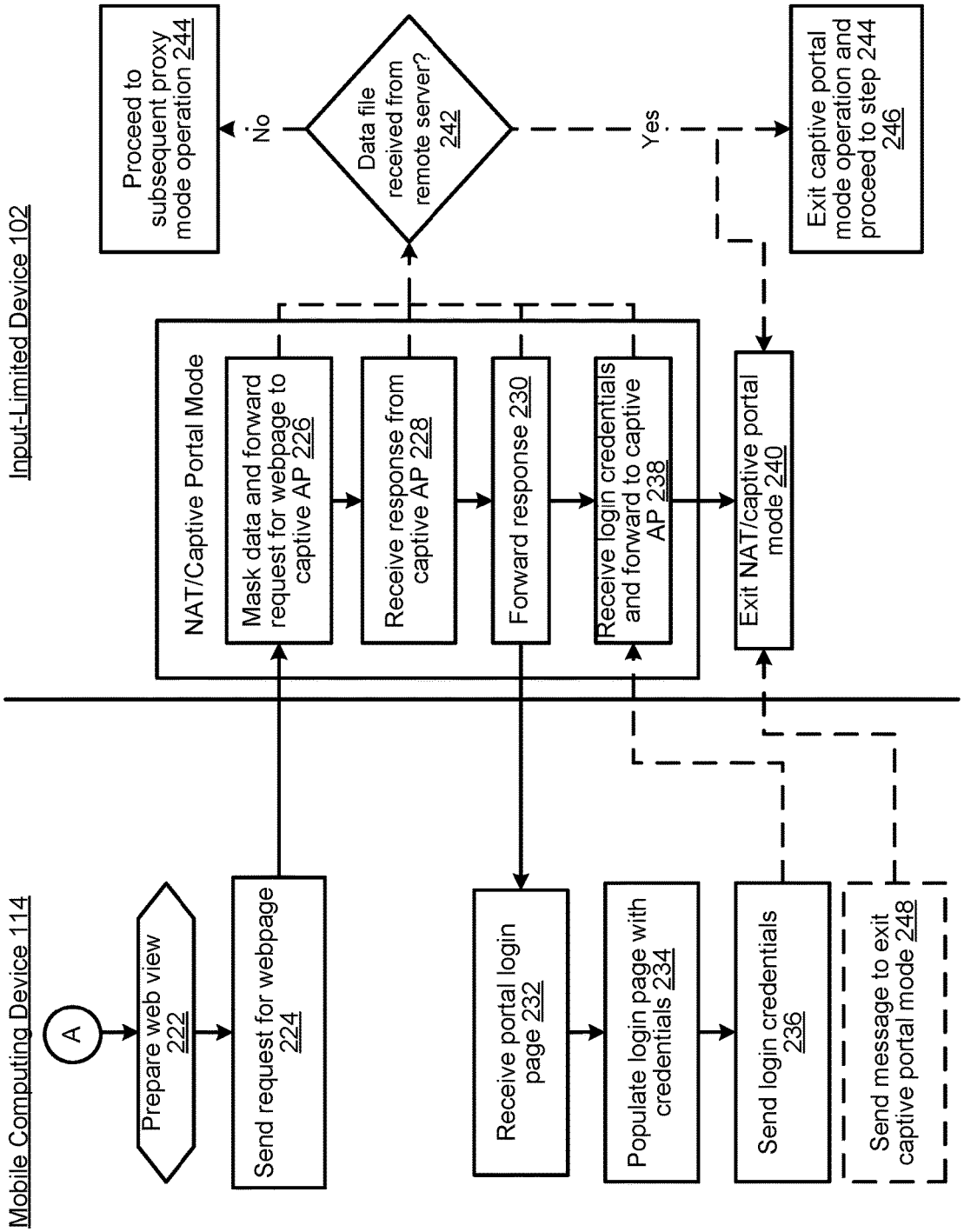

FIGS. 2A and 2B illustrate an example of a process directed by the mobile computing device 114 for sharing credentials with the device 102. Referring to FIG. 2A, either the mobile computing device 114 or the device 102 establishes a connection/pairs with the reciprocal device (illustrated as 202). This connection may be part of a typical set-up process. For example, a user of the mobile computing device 114 may access an application on the mobile computing device 114 using a service set identifier (SSID), and the application may use credentials to connect to the device 102. The credentials may include information about the mobile computing device 114, information about the device 102, or a combination thereof. Once the mobile computing device 114 and the device 102 are connected, the mobile computing device 114 directs the device 102 to connect to a network (illustrated as 204). For example, the mobile computing device 114 may gain access to a network and, subsequently, the mobile computing device 114 may indicate to the device 102 a wireless network identifier associated with a service set identifier (SSID) of the network that the mobile computing device 114 is authorized to access. Alternatively, the device 102 may attempt to connect to a network on its own.

In response, the device 102 checks for the presence of a network (illustrated as 206). The network being searched for may be a wireless network or wired network. (Indeed, the captive portal access procedures described herein may be used with wireless or wired network access.) When the captive portal access point 110 is identified, the device 102 opens a link with the captive portal access point 110 (illustrated as 208). The device 102 then attempts to send a data file request to the remote server 103 (illustrated as 210). Since the captive portal access point 110 is captive, the device 102 receives a message (or some other data not expected) in response to sending the data file request (illustrated as 212). For example, the received message may be an error message or a redirect message. Additionally, the received message can explicitly indicate the accessed access point as being captive. Then, the device 102 interprets/analyzes the received message and therefrom determines the accessed access point is captive (illustrated as 214). Thereafter, the device 102 enters a captive portal mode (illustrated as 216). The captive portal operation mode of the device 102 masks data received by the device 102 so the data appears as if it originated at the device 102. For example, the device 102 may implement Network Address Translation (NAT) protocols that transforms the original Internet Protocol (IP) address of the data into the device's IP address by modifying network address information in IP packet headers of the data. The device 102 (after entering its captive portal mode) then forwards an indication detailing that the captive portal access point 110 is captive to the mobile computing device 114 (illustrated as 218).

The mobile computing device 114 receives the indication (illustrated as 220) and prepares a web view (i.e., opens a web connection) (illustrated as 222 in FIG. 2B). The web view could be prepared in a web browser or within a non-web browser application of the mobile computing device 114. The mobile computing device 114 then sends a request (e.g., a HTTP GET request) for a webpage to the device 102 (illustrated as 224), which masks the request (so it appears it originated from the device 102) and forwards the request to the captive portal access point 110 (illustrated as 226). Masking/replacing the header data may not modify content of the HTTP data payload. For example, the source IP address in the IP header may be modified, and the IP check sum as a response. Moreover, the layer II encapsulation header may be modified to include data specific to the device 102. But the data payload being exchanged (which includes the authentication/credential data to access the captive portal) is not altered.

In an example, instead of merely altering the header data of the received webpage request, the device 102 generates a new, second webpage request that includes identifying information of the device 102, not the mobile computing device 114. In this example, the newly generated, second webpage request is sent to the captive portal access point 110, not the webpage request generated by the mobile computing device 114.

The device 102 then receives a response from the captive portal access point 110 (illustrated as 228). The response may include the portal login page or an HTTP REDIRECT response. For example, the HTTP redirect may be an error message that includes a request for credentials to be used to gain Internet access through the captive portal access point 110. The device 102 then forwards the response to the mobile computing device 114 (illustrated as 230). In an example, the device 102 may unmask the received response (i.e., review the content of the received response/data packets) to determine the response should be forwarded to the mobile computing device 114.

After receiving the data packets comprising the portal login page from the device 102 (illustrated as 232), the webpage is instantiated by the web browser or other application of the mobile computing device 114, and is populated with login credentials by the mobile computing device 114 (illustrated as 234), for example by a user inputting the credentials into the mobile computing device 114. As noted above, fields may be completed, button and/or check buttons may be set, etc. A user may also interact with the webpage via a direct input user interface of the mobile computing device 114 (e.g., touch screen, single-keystroke direct user entry keyboard, etc.), and cause the registration to be submitted upon completion (e.g., click or touch an "enter" button on the portal login page). Then the mobile computing device 114 sends the login credentials to the device 102 (illustrated as 236).

The device 102 receives the login credentials, masks the login data to make it appear as if it originated from the device 102, and sends the login credentials to the captive portal access point 110 (illustrated as 238). For example, the device 102 may alter the headers/source IP/MAC information, but not the payload data, so the data appears like its coming from the device 102. Thereafter, the access point may confirm access and the device 102 stops/exits NAT/captive portal mode (illustrated as 240). Once this occurs, the device 102 no longer masks data.

The device 102 may repeatedly (e.g., after each step performed by the device 102 while in captive portal mode) attempt to retrieve a data file from the remote server 103. After each attempt, the device 102 determines whether it received a data file from the remote server 103 (illustrated as 242). If the device 102 did not receive a file, the device 102 performs the subsequent captive portal mode operation (illustrated as 242). For example, if step 242 is performed after step 226, and it is determined no file was received, the device 102 would then perform step 228. Alternatively, if it is determined that the device 102 received a file from the remote server 103, the device 102 exits it captive portal mode operation protocol (illustrated as 246). Alternatively, the mobile computing device 114 may send a message to the device 102 that causes the device 102 to exit captive portal mode (illustrated as 248).

FIGS. 3A and 3B are a signal flow diagram based on the processes in FIGS. 2A and 2B. Incidental signals such as acknowledgements and communication link set-up protocol messages are omitted for brevity.

Either the mobile computing device 114 or the device 102 requests establishment of a connection between the devices (illustrated as 302). After the link is established, the mobile computing device 114 sends a directive to the device 102 to connect to a network (illustrated as 304). The device 102 then checks for a network and, after identifying the presence of the access point 110, associates with the captive portal access point 110 (illustrated as 306). Thereafter, the captive portal access point 110 sends an access confirmation to the device 102 (illustrated as 308). The device 102 then attempts to send a data file request to the remote server 103 (illustrated as 310), but the request is stopped by the captive portal access point 110. The captive portal access point 110 then sends a message (e.g., an error message) to the device 102 in response (illustrated as 312). This error message may also include a request for credentials to be used to gain Internet access through the captive portal access point 110. The error message indicates to the device 102 that it has network access, but not Internet access. The device 102 thereafter identifies the captive portal access point 110 as captive and institutes its masking/captive portal protocols (not illustrated). Once entering a captive portal mode, the device 102 sends an indication, detailing that the captive portal access point 110 is captive, to the mobile computing device 114 (illustrated as 314).

In response to receiving the indicator, the mobile computing device 114 prepares a web view (not illustrated). Then, the mobile computing device 114 sends a request (e.g., a HTTP GET request) for a webpage to the device 102, which masks and forwards the request to the captive portal access point 110 (illustrated as 316). When the device 102 receives the request data, the request data has information identifying the mobile computing device 114 as the source of the request. Since the device 102 is in a captive portal mode when it receives the request, the device 102 changes the source identifying information of the request from the mobile computing device 114 to the device 102. By doing this, the device 102 masks the data so it appears as if the data originated from the device 102 when it is received by the captive portal access point 110. After receiving the webpage request, the captive portal access point 110 sends a response (e.g., data corresponding to a portal login/registration page) to the device 102, which unmasks the data (to determine it needs to be sent to the mobile computing device 114) and forwards it to the mobile computing device 114 (illustrated as 318). As described above, the device 102 masks data forwarded from the mobile computing device 114 to the captive portal access point 110. When forwarding data in the reverse direction (i.e., from the captive portal access point 110 to the mobile computing device 114), the device 102 may or may not be configured to mask data. After it receives the portal login page, the mobile computing device 114, or a user thereof, populates the login page with credentials and transmits the login information to the captive portal access point 110, through the device 102 (illustrated as 320).

When the device 102 receives an indication that the mobile computing device's web browser is closed, the device 102 exits its captive portal mode (i.e., ceases implementing its captive portal protocols) (not illustrated) and sends a data file request to the remote server 103 (illustrated as 322 in FIG. 3B). If the mobile computing device 114 submitted proper login/registration information to the captive portal access point 110, the remote server 103 is properly accessed (i.e., the device 102 has Internet access) and the remote server 103 sends the device 102 a data file (illustrated as 324). If the device 102 verifies the received file is the same file that was requested, (for example, by comparing the received data file is the same as a reference data file stored in memory of the device 102), the device 102 sends an indication to the mobile computing device 114 representing that the device 102 is connected to the Internet (illustrated as 326). The Internet access indicator may be sent in response to an initial communication from the mobile computing device 114. The device 102 may now continue to operate with the Internet connection.

At some point, however, the device 102 may become disconnected from the captive portal access point 110 for a variety of reasons, such as when the device 102 leaves the Wi-Fi range of the captive portal access point 110, the device 102 loses power, the Internet access times out (e.g., a hotel's 24 hour access expires), etc. When this occurs, it is necessary to re-establish an Internet connection between the device 102 and the captive portal access point 110. For example, the captive portal access protocols described herein above may be performed to reconnect the device 102 to the Internet via the captive portal access portal 110. Given that device 102 may also be output-limited, however, it may not be immediately apparent to a user that the Internet connection needs to be re-established. Thus, it may be desirable for the system 100 to notify the user that the device 102 has lost its connect through a notification sent to a different device, for example the mobile computing device 114 (which may be the same device or a different device used to initially connect the device 102 to the captive portal access point 110). In view of the foregoing, FIG. 4 illustrates a signal flow for re-authentication the device 102 to the captive portal system 190. In the first instance, the device 102 is connected to the server 103 via the captive portal access point (illustrated as 402). When the connection is established, the server 103 may determine that it is connected to the device 102 via a captive portal access point. In an example, the server 103 may be notified by the device 102 that the access point is a captive portal access point. At some point in time thereafter, the server 103 determines that the connection between the device 102 and server 103 has ceased/terminated (illustrated as 404). This may be determined by the server 103 failing to receive a keep-alive signal from the device 102, or through some other failure in communication between the server 103 and device 102. The server 103 may determine a user associated with the device 102 (e.g., using a user profile) (illustrated as 406). Knowing the user (or user profile) associated with the device 102, the server 103 may identify another device (or notification destination such as an email account or the like) associated with the same user/user profile, for example the mobile computing device 114. The server 103 may then cause a notification to be sent to the mobile computing device 114 associated with the user (illustrated as 408), where the notification indicates that the connection between the device 102 and server 103 has ceased. If more than one mobile computing device is associated with the identified user, it should be appreciated that the notification may be sent to one, some, or all of the associated mobile computing devices. Alternatively (or in addition) the server 103 may also send the notification to an email address, text address destination, SIM card destination, etc. where the destination is somehow associated with the device 102. Thus, communication of the notification to the mobile computing device 114 (or other device) may occur via a messaging service, and the like.

The mobile computing device 114 then conveys (audibly and/or visually) the notification (illustrated as 410). For example, the mobile computing device 114 may audibly convey information indicating the device 102 needs to be reconnected to the captive portal access point 110, may display a text message, or the like. According to this example, the mobile computing device 114 may receive audio data (include with or within the notification) from the server 103, which the mobile computing device 114 may then output. For example, the server 103 may synthesize audio data for a spoken message along the lines of "please reconnect your device" which the mobile computing device 114 may play back. Thus, when the mobile computing device 114 receives audio data from the server 103, the mobile computing device 114, may or may not perform automatic speech recognition (ASR), natural language understanding (NLU), and/or text-to-speech (TTS) processes prior to outputting audio corresponding to the received audio data.

In another example, the mobile computing device 114 may audibly convey information indicating the device 102 needs to be reconnected to the captive portal access point 110, without receiving audio data from the server. For example the server 103 may send text data to the mobile computing device 114 which may be configured to perform ASR, NLU, and/or TTS processes to convert the text data received from the server 103 into audio, which is output by the mobile computing device 114.

In a further example, the mobile computing device 114 may have pre-configured audio data stored thereon, which indicates the device 102 needs to be reconnected to the captive portal access point 110. According to this example, when the mobile computing device 114 receives the notification, the mobile computing device 114 may merely select the stored audio data, and output audio corresponding thereto.

In an additional example, the mobile computing device 114 may visually display information (e.g., text) indicating the device 102 needs to b reconnected to the captive portal access point 110. According to this example, the mobile computing device 114 may receive data (include with or within the notification) from the server 103, which the mobile computing device 114 may then output. Other notification forms (e.g., haptic, etc.) may also be possible.

While the data communicated to the mobile computing device 114 by the server 103 is described herein as a notification, it should be appreciated that the data may simply be an indication or message that causes the mobile computing device 114 to perform a certain action. For example, the server 103 may send the mobile computing device 114 a message to "output text message 3." In response, the mobile computing device 114 may visually display text corresponding to, for example, "Reconnect the Input-Limited Device to the Internet." The mobile computing device 114 may determine the appropriate data to output to the user in response to receiving the indication/message from the server 103 using a lookup table of output data stored on the mobile computing device 114.

After receiving and outputting the notification, the mobile computing device 114 and the device 102 perform some or all of the captive portal login protocols described herein (illustrated as 412). For example, in order for the device 102 to be re-authenticated, it may be desirable for the mobile computing device 114 and the device 102 to automatically attempt to connect to each other upon the device 102 losing Internet access and the mobile computing device 114 receiving the notification from the server 103. In another example, upon receiving the notification, a Wi-Fi network of the mobile computing device 114 may automatically be changed to that of the device 102, thereby connecting the mobile computing device 114 and device 102 to allow the device 102 to be authenticated automatically (i.e., without user initiation). Moreover, the device 102 may, upon losing Internet connection, configure itself into its captive portal mode described herein. This enables the mobile computing device 114 to quickly attempt to reconnect the device 102 once the mobile computing device 114 receives the notification. In yet another example, the device 102 and the mobile computing device 114 may be connected to the same local network. According to this example, the mobile computing device 114 may identify the device 102 using the local network, regardless of whether the device 102 enters its captive portal mode upon the device 102 losing its Internet connection. Once the device 102 has regained Internet access via the captive portal access point 110, the device 102 reconnects to the server 103 (illustrated as 414).

Re-authentication of the device 102 with the captive portal access point 110 may be performed securely. For example, a private service set identifier (SSID) used to connected the device 102 to the captive portal access point 110 in the first instance may be communicated to the server 103. The SSID may be communicated to the server 103 when the device 102 connects to the server 103 via the captive portal access point 110. The SSID used to connect the device 102 to the captive portal access point 110 in the first instance may be used to reconnect the device 102 to the captive portal access point 110 when a connection is lost. The notification sent to the mobile computing device 114 may include the SSID, thereby allowing a user of the mobile computing device 114 to skip a Wi-Fi selection process when reconnecting the device 102 to the captive portal access point 110. By skipping the Wi-Fi selection process, the mobile computing device 114 and/or the device 102 may automatically configure into captive portal modes upon the mobile computing device 114 receiving the notification.

Figure 5A:
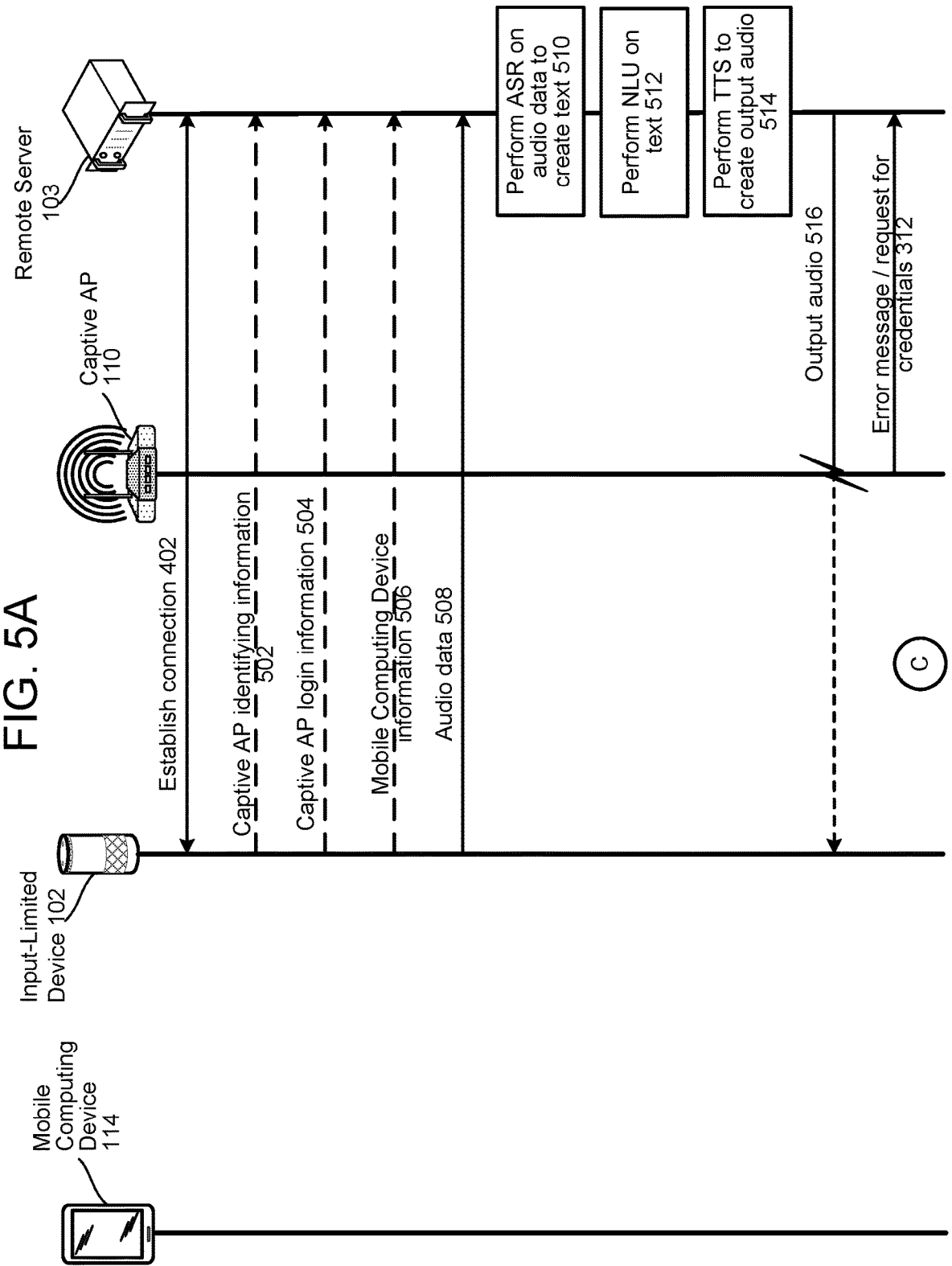

FIGS. 5A and 5B illustrate signal flows for re-authenticating the device 102 to the captive portal system 190. The device 102 and the server 103 establish a connection via the captive portal access point 110 (illustrated as 402). The device 102 may send the server 103 captive portal access point identifying information (illustrated as 502), captive portal access point login information (illustrated as 504), and/or mobile computing device information (illustrated as 506). As part of normal operation in receiving and processing a voice command, the device 102 may receive audio including a spoken command from a user. The device 102 then processes that spoken command into audio data and sends the server 103 the audio data (illustrated as 508). The server 103 may then perform ASR on the audio data to create text (illustrated as 510), NLU on the text (illustrated as 512), and TTS to create output audio (illustrated as 514). The server 103 then attempts to send the output audio to the device 102 (illustrated as 516), but the transmission is stopped by the captive portal access point 110, which sends a message (e.g., an error message) to the server 103 in response (illustrated as 312). Therefrom, the server 103 determines the connection between the server 103 and the device 102 has ceased/terminated (illustrated as 404 in FIG. 5B). Depending upon implementation, the server 103 may determine a user associated with the device 102 (e.g., using a user profile) (illustrated as 406), and thereafter sends or causes to be sent a notification to a mobile computing device 114 affiliated with the user (illustrated as 408). For example, if mobile computing device information (i.e., corresponding to the mobile computing device that originally connected the device 102 to the captive portal access point 110) is sent to the server 103 during step 506, it may not be necessary to determine a user associated with the device 102. That is, the notification can merely be sent to the mobile computing device represented in the mobile computing device information. Optionally, the mobile computing device 114 may identify the input-limited device 102 using information identifying the captive portal access point 110 (illustrated as 518). In this example, the captive portal access point identifying information may be communicated to the mobile computing device 114 within or with the notification. If the mobile computing device 114 identifies the input-limited device 102 using the information, it should be appreciated that re-authentication of the input-limited device 102 may occur automatically (i.e., without user initiation). As such, it should be appreciated that the mobile computing device 114 may be configured to not convey/display the notification to a user when the mobile computing device 114 is able to identify the input-limited device 102 using the captive portal access point information, and thereby automatically re-authenticate the input-limited device 102. For example, the captive portal access point identifying information may include local network information. As such, the mobile computing device 114 may identify the input-limited device 102 using the local network, to which the mobile computing device 114 may also be connected. The mobile computing device 114 then audibly conveys or visually displays the notification (illustrated as 410). After receiving and outputting the notification, the mobile computing device 114 and the device 102 perform some or all of the captive portal login protocols described herein (illustrated as 412), and the device 102 reconnects to the server 103 (illustrated as 414).

As described herein, the mobile computing device 114 and the device 102 may perform some, but not all, of the captive portal login protocols as described herein when reconnecting the device 102 to the captive portal access point 110. In order to limit the amount of data exchange needed to be re-performed each time the connection is lost between the device 102 and the server 103, the device 102 may send the server 103 certain information such as network information (e.g., the network name), login information, etc. that may be re-used for re-connection attempts. Knowing this information and the identity of the captive portal access point 110, the server 103 can send this information in the notification to the mobile computing device 114. The mobile computing device 114 may then use the information to bypass some of the captive portal login protocols needed to authenticate the device 102 with the captive portal access point 110 in the first instance. As such, it should be appreciated that the notification sent from the server 103 and received by the mobile computing device 114 may automatically configure the mobile computing device 114 and/or the device 102 into captive portal modes as described herein. Additionally, for example, the notification sent from the server 103 and received by the mobile computing device 114 may automatically configured the mobile computing device 114 and/or the device 102 into Bluetooth or Wi-Fi pairing modes.

FIG. 6 illustrates signal flows for re-authenticating the device 102 to the captive portal system 190. The device 102 and the server 103 establish a connection via the captive portal access point 110 (illustrated as 402). The device 102 sends the server 103 location data indicating, for example, a geolocation of the device 102 (illustrated as 602). The server 103 either includes or has access to a data store wherein location data specific to captive portal access points is stored. Within the data store, each captive portal access point may be associated with a length of time after which the respective captive portal access point terminates an Internet connection. According to FIG. 6, the server 103 accesses a lookup table (illustrated as 604) and, using the location data, determines a captive portal access point that the device 102 is connected to and therefrom determines when the captive portal access point 110 will terminate the device's Internet connection (illustrated as 606). Prior to the captive portal access point 110 terminating the device's Internet connection, the server 103 sends the device 102, via the captive portal access point 110, a signal to convey a notification indicating the device 102 will lose Internet connection within a threshold amount of time (e.g., one minute, five minutes, etc.) (illustrated as 608). The device 102 then audibly or visually conveys the notification (illustrated as 610). A user of the mobile computing device 114, upon receiving or observing the notification, then causes the mobile computing device 114 to re-authenticate the device 102 with the captive portal access point 110 by performing some or all of the captive portal login protocols described herein (illustrated as 412). The device 102, once again being connected to the Internet, then establishes a connection with the server 103 (illustrated as 414).

FIG. 7 illustrates signal flows for re-authenticating the device 102 to the captive portal system 190. The device 102 and the server 103 establish a connection via the captive portal access point 110 (illustrated as 402). The device 102 sends the server 103 data indicative of the connection. For example, the data may indicate a location of the device 102 (illustrated as 602). For example, the data may be geolocation data, data indicating the type of establishment (e.g., hotel, etc.) the device 102 is located at, etc. The server 103 may include or have access to a data store wherein location data specific to captive portal access points is stored. Within the data store, each captive portal access point may be associated with a length of time after which the respective captive portal access point terminates an Internet connection. According to FIG. 7, the server 103 accesses a lookup table (illustrated as 604) and, using the location data, determines a captive portal access point that the device 102 is connected to and therefrom determines when the captive portal access point 110 will terminate the device's Internet connection (illustrated as 606). The server may also do so using other data regarding the connection (which may include, for example an indication of an expiration of the connection). The server 103 then determines a user associated with the device 102 (e.g., using a user profile) (illustrated as 406), and thereafter sends or causes to be sent a notification to a mobile computing device 114 affiliated with the user (illustrated as 408). The mobile computing device 114 then audibly conveys or visually displays the notification (illustrated as 410). After receiving and outputting the notification, the mobile computing device 114 and the device 102 perform some or all of the captive portal login protocols described herein (illustrated as 412), and the device 102 reconnects to the server 103 (illustrated as 414).

Figure 8:
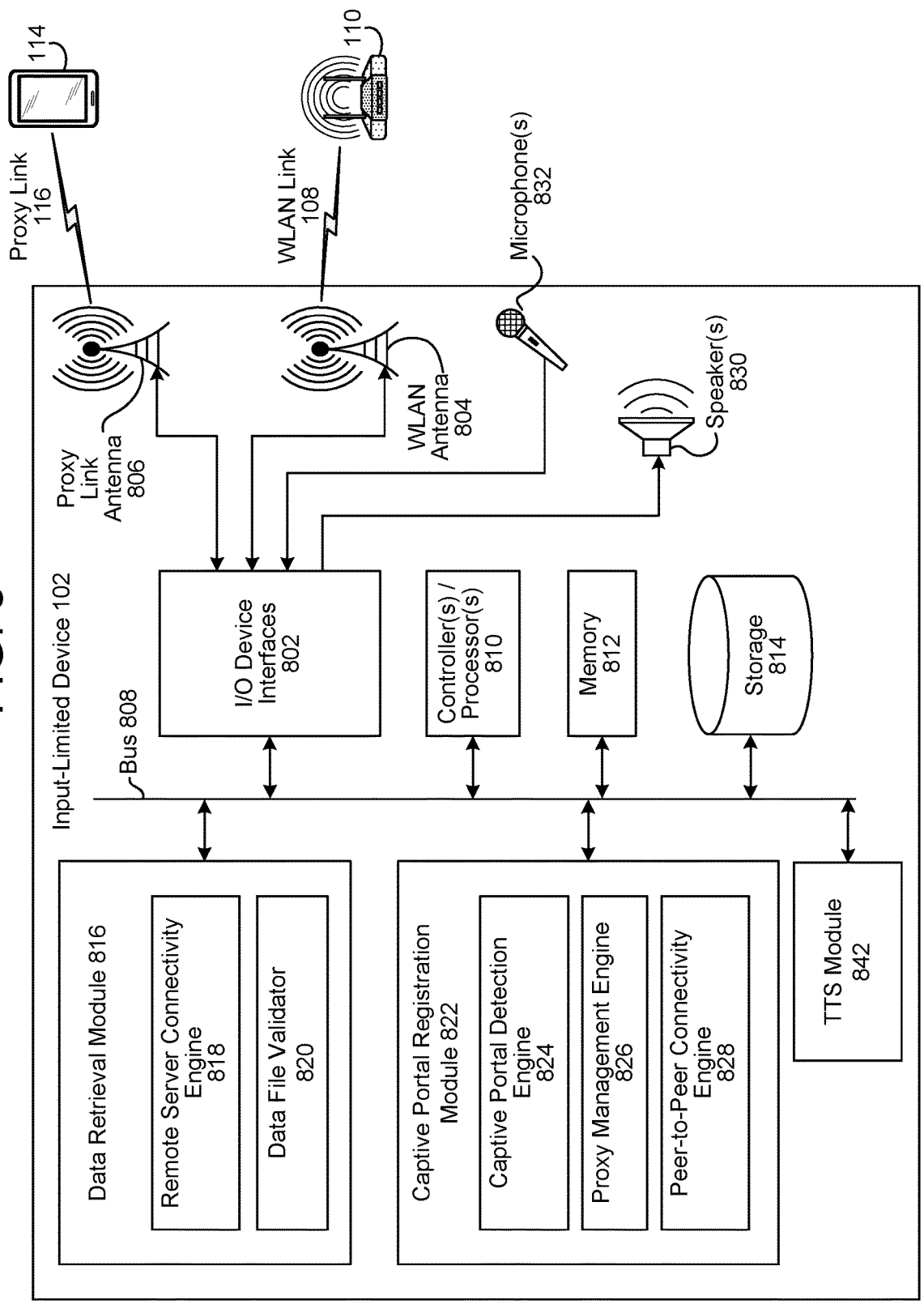
FIG. 8 is a block diagram conceptually illustrating example components of an input-limited device.
Figure 9:
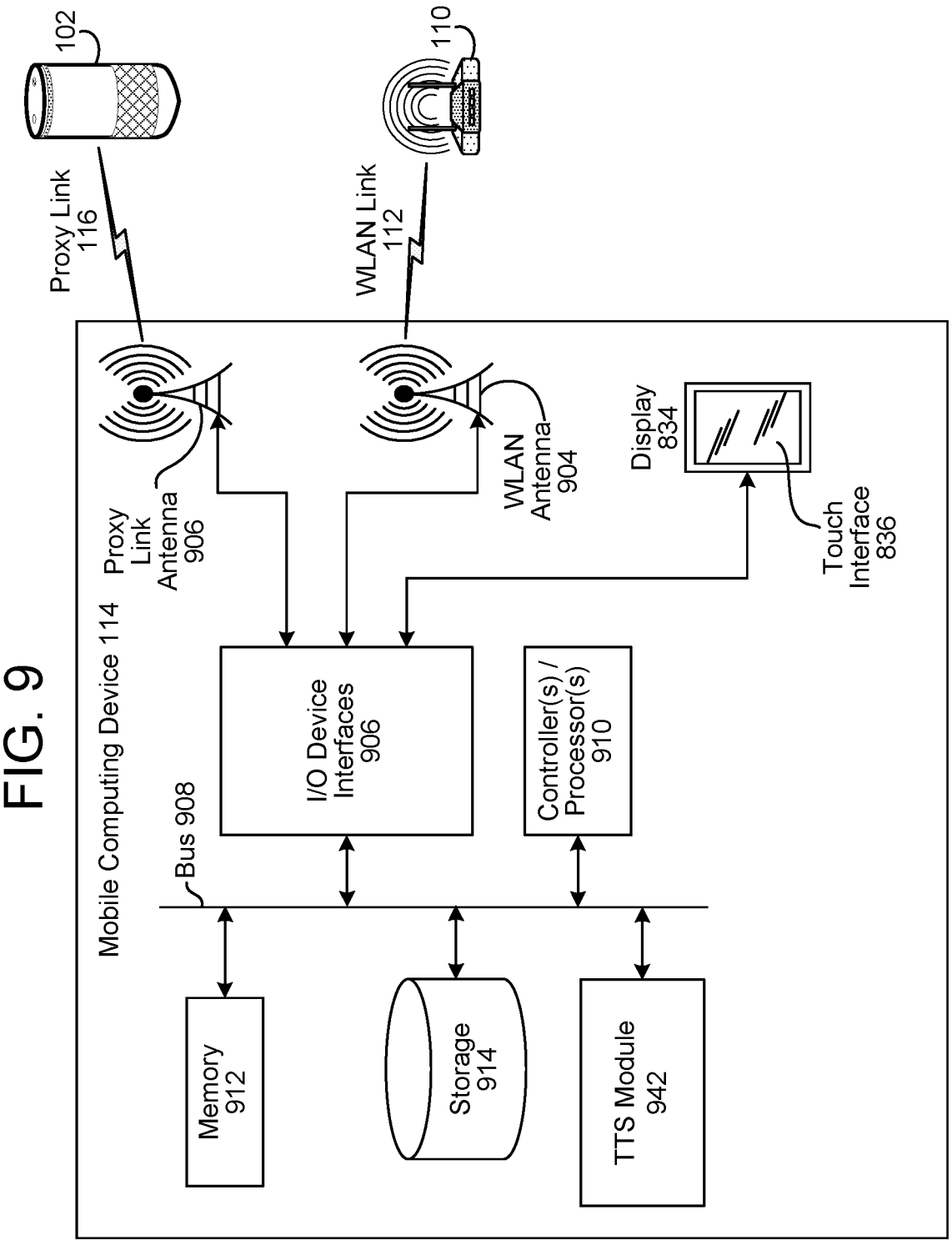
FIG. 9 is a block diagram conceptually illustrating example components of a mobile computing device.
Figure 10:
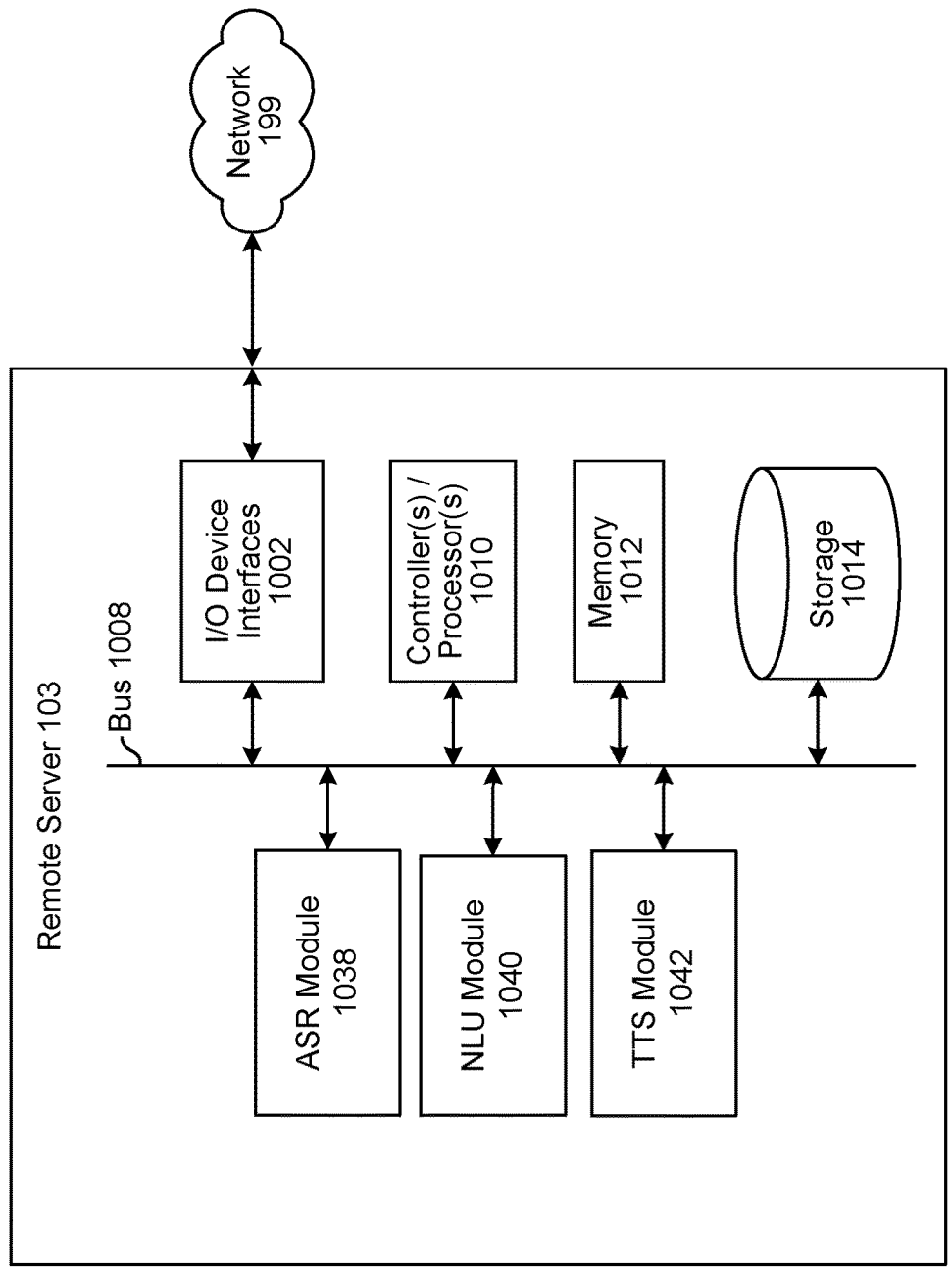
FIG. 10 is a block diagram conceptually illustrating example components of a server.

FIGS. 8, 9, and 10 are block diagrams conceptually illustrating example components of the device 102, mobile computing device 114, and server 103, respectively.

As illustrated in FIG. 8, the device 102, being an input-limited device, lacks conventional rich user input capabilities, such as a keyboard and/or a touch screen able to accept direct single-keystroke entry of text. The device 102, mobile computing device 114, and server 103 include input/output (I/O) device interfaces (802/902/1002), which provide the device 102, mobile computing device 114, and server 103 with connectivity and protocol support. A variety of input and output connections may be made through the input/output device interfaces (802/902/1002). For example, a WLAN antenna (804/904) may be used to provide connectivity to the captive portal access point 110. The same WLAN antenna (804/904) or another antenna (806/906) may be used for the proxy link 116.

A variety of protocols may be supported by the I/O device interfaces (802/902/1002) for the proxy link 116. For example, the proxy link 116 may be Bluetooth, WiFi Direct, or Near Field Communication (NFC). In the alternative, instead of using a radio frequency (RF) interface for the peer-to-peer link, the link may be based on another technology, such as ultrasonic communication or infrared communication. Also, either in addition to or as an alternative to the WLAN antenna (804/904) servicing the WLAN link 108 to the captive portal access point 110, the I/O device interfaces (802/902/1002) may support a wired connection such as Ethernet by which to connect to the captive portal system 190 and the network 199.

The input/output device interfaces (802/902) may also support other types of connections and communications protocols. For example, the device 102 and/or mobile computing device 114 may also include an interface for an external peripheral device connection such as universal serial bus (USB), FireWire, Thunderbolt, or other wired connection protocol.

The I/O device interfaces (802/902) may also support other wireless connection protocols in addition to WLAN (e.g., WiFi), Bluetooth, WiFi Direct and/or NFC. For example, the peer-to-peer proxy link 116 may communicate using IrDA, wireless USB (universal serial bus), Z-Wave (a home automation radio technology), and/or ZigBee (i.e., the IEEE 802.15.4 standards). Instead of or in addition to WLAN and/or Ethernet, the peer-to-peer proxy link 116 may be replaced with some other type of network communication support, such as cellular data communications related to a Long Term Evolution (LTE) network, WiMAX network, CDMA network, GSM network, etc. For example, the captive portal system 190 may support LTE connectivity, where a client device (e.g., the device 102 or mobile computing device 114) associated with an unregistered subscriber identification module (SIM) is provided the opportunity to register via a portal webpage transmitted to the client device after it opens the communication link or attempts to access the network.

The device 102, mobile computing device 114, and server 103 may include an address/data bus (808/908/1008) for conveying data among components of the device 102, mobile computing device 114, and server 103, respectively. Each component within the device 102, mobile computing device 114, and server 103 may also be directly connected to other components in addition to (or instead of) being connected to other components across the bus (808/908/1008).

The device 102, mobile computing device 114, and server 103 may include one or more controllers/processors (810/910/1010), that may each include a central processing unit (CPU) for processing data and computer-readable instructions, and a memory (812/912/1012) for storing data and instructions. The memory (812/912/1012) may include volatile random access memory (RAM), non-volatile read only memory (ROM), non-volatile magnetoresistive (MRAM) and/or other types of memory. The device 102, mobile computing device 114, and server 103 may also include a data storage component (814/914/1014), for storing data and controller/processor-executable instructions (e.g., instructions to perform the processes described herein). The data storage component (814/914/1014) may include one or more non-volatile storage types such as magnetic storage, optical storage, solid-state storage, etc. The device 102 and/or mobile computing device 114 may also be connected to removable or external non-volatile memory and/or storage (such as a removable memory card, memory key drive, etc.) through the input/output device interfaces (802/902).

Computer instructions for operating the device 102, mobile computing device 114, and/or the server 103 and their various components may be executed by the controller(s)/processor(s) (810/910/1010), using the memory (812/912/1012) as temporary "working" storage at runtime. The computer instructions may be stored in a non-transitory manner in non-volatile memory (812/912/1012), storage (814/914/1014), or an external device. Alternatively, some or all of the executable instructions may be embedded in hardware or firmware in addition to or instead of software.

The device 102 further includes a data retrieval module 816. The data retrieval module 816 includes a remote server connectivity engine 818 and a data file validator 820. The data retrieval module 816 operates in a conventional fashion, with the exception that the remote server connectivity engine 818 may share connectivity transaction data (e.g., receipt of portal data pushed to the device 102 from the captive portal access point 110, inability to connect to the remote server 103 after establishing WLAN link 108, etc.) with a captive portal registration module 822. The data file validator 820 may be used, for example, to confirm if a data file has been received from the remote server (thus indicating that the input-limited device 102 has access to the Internet).

The captive portal registration module 822 includes a captive portal detection engine 824 that determines that the access point 110 is captive. For example, the captive portal detection engine 824 may, after the remote server connectivity engine 818 attempts to transmit a data file request over the network 199, determine that the error message received in response is not the elicited data file. A proxy management engine 826 of the captive portal registration module 822 performs processes connected with captive portal proxy (CPP) mode operations. A peer-to-peer connectivity engine 828 of the captive portal registration module 822 performs processes to establish the peer-to-peer proxy link 116. The proxy management engine 826 determines that proxy operations are warranted based on a determination by the captive portal detection engine 824 that the access point 110 is captive. The proxy management engine 826 is responsible for CPP mode establishment and operations, in coordination with the peer-to-peer connectivity engine 828, which manages the peer-to-peer proxy link 116 (e.g., establishment and tear-down).

The input/output device interfaces 802 of the device 102 may connect to an audio output component such as a speaker 830, a wired headset or a wireless headset (not illustrated) or an audio capture component. The audio capture component may be, for example, a microphone 832 or array of microphones (not illustrated), a wired headset or a wireless headset (not illustrated), etc. The microphone 832 may be configured to capture audio, including speech including an utterance. The device 102 (using the microphone 832, an audio processing component (not illustrated), etc.) may be configured to determine audio data corresponding to the captured audio (e.g., audio data directing the device 102 to retrieve a data file). The device 102 (using the input/output device interfaces 802, antennae 804, 806, etc.) may also be configured to transmit the audio data to a server (such as the remote server 103) for further processing.

The mobile computing device 114 may include various inputs/outputs. For example, the mobile computing device 114 may include a display 934 having a touch interface 836. While not illustrated, it should also be appreciated that the mobile computing device 114 may include a keyboard capable of receiving single-stroke alphanumeric inputs.

The server 103 may include an ASR module 1038. The ASR module 1038 may include language models stored in an ASR model storage component. If limited speech recognition is desirable, the ASR module 1038 may be configured to identify a limited number of words. In contrast, if verbose speech recognition is desirable, extended speech recognition may be configured to recognize a much larger range of words.

The server 103 may include a NLU module 1040. The NLU module 1040 may comprise a name entity recognition module, an intent classification module, and/or other components. The NLU module 1040 may also include a stored knowledge base and/or entity library, or those storages may be separately located.

To create output speech, the device 102, mobile computing device 114, and server 103 may be configured with a text-to-speech ("TTS") module (842/942/1042) that transforms text data into audio data representing speech. The TTS module (842/942/1042) may include a TTS storage for converting text into speech. The TTS module (842/942/1042) may include its own controller(s)/processor(s) and memory or may use the controller/processor and memory of the device 102, mobile computing device 114, and server 103 described above. Similarly, the instructions for operating the TTS module (842/942/1042) may be located within the TTS module (842/942/1042), within the memory and/or storage of the device 102, mobile computing device 114, and server 103 described above, or within an external device.

Text input into a TTS module (842/942/1042) may be processed to perform text normalization, linguistic analysis, and linguistic prosody generation. During text normalization, the TTS module (842/942/1042) processes the text input and generates standard text, converting such things as numbers, abbreviations (such as Apt., St., etc.), and symbols ($, %, etc.) into the equivalent of written out words.

During linguistic analysis the TTS module (842/942/1042) analyzes the language in the normalized text to generate a sequence of phonetic units corresponding to the input text. This process may be referred to as phonetic transcription. Phonetic units include symbolic representations of sound units to be eventually combined and output as speech. Various sound units may be used for dividing text for purposes of speech synthesis. The TTS module (842/942/1042) may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary, for example in the TTS storage. The linguistic analysis performed by the TTS module (842/942/1042) may also identify different grammatical components such as prefixes, suffixes, phrases, punctuation, syntactic boundaries, or the like. Such grammatical components may be used by the TTS module (842/942/1042) to craft a natural sounding audio waveform output. The language dictionary may also include letter-to-sound rules and other tools that may be used to pronounce previously unidentified words or letter combinations that may be encountered by the TTS module (842/942/1042). Generally, the more information included in the language dictionary, the higher quality the speech output.

Based on the linguistic analysis, the TTS module (842/942/1042) may then perform linguistic prosody generation where the phonetic units are annotated with desired prosodic characteristics, also called acoustic features, which indicate how the desired phonetic units are to be pronounced in the eventual output speech. During this stage the TTS module (842/942/1042) may consider and incorporate any prosodic annotations that accompanied the text input. Such acoustic features may include pitch, energy, duration, and the like. Application of acoustic features may be based on prosodic models available to the TTS module (842/942/1042). Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module (842/942/1042), the TTS module (842/942/1042) may assign more robust and complex prosodic characteristics that vary across the portion, thus making the portion sound more human, resulting in higher quality audio output.

The TTS module (842/942/1042) may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module (842/942/1042) may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module (842/942/1042) may perform speech synthesis using one or more different methods. In one method of synthesis called unit selection, described further below, the TTS module (842/942/1042) matches the symbolic linguistic representation against a database of recorded speech, such as a database of a voice corpus. The TTS module (842/942/1042) matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module (842/942/1042) may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module (842/942/1042) to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module (842/942/1042) may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the MINI and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module (842/942/1042) may be configured to perform TTS processing in multiple languages. For each language, the TTS module (842/942/1042) may include specially configured data, instructions, and/or components to synthesize speech in the desired language(s). To improve performance, the TTS module (842/942/1042) may revise/update the contents of the TTS storage based on feedback of the results of TTS processing, thus enabling the TTS module (842/942/1042) to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module (842/942/1042) may include specialized databases or models to account for user preferences.

For example, to create the customized speech output of the system 100, the system 100 may be configured with multiple voice corpuses/unit databases, where each unit database is configured with a different "voice" to match desired speech qualities. The voice selected by the TTS module (842/942/1042) to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system 100 may provide.

While the illustrations herein discuss a captive portal situation, where login is accomplished using a webpage, the method and system herein may be used with other login situations. For example, the present system may be used when a first device is used to connect a second device to a network, and the login credentials are supplied by the first device, but altered to appear as if coming from the second device, and sent to a network access device so that the second device may be connected to the network.

The concepts disclosed herein may be applied within a number of different devices and computer systems, including for example, input-limited computer systems such as multimedia set-top boxes, wearable computing devices (watches, glasses, etc.), etc., and full-featured computing devices, including for example, laptop computers, cellular "smart" telephones, personal digital assistants (PDAs), tablet computers, wearable computing devices (e.g., watches, glasses), etc.

The disclosed examples were chosen to explain the principles and application of the disclosure and are not intended to be exhaustive or to limit the disclosure. Many modifications and variations of the disclosed aspects may be apparent to those of skill in the art. Persons having ordinary skill in the field of device credentials sharing should recognize that components and process steps described herein may be interchangeable with other components or steps, or combinations of components or steps, while still achieving the benefits and advantages of the present disclosure. Moreover, it should be apparent to one skilled in the art, that the disclosure may be practiced without some or all of the specific details and steps disclosed herein.

The processes and device operations related to credentials sharing and CPP-mode operations may be performed as operating system level operations and/or by software applications executed by the device 102 and the mobile computing device 114. As such, aspects of the disclosed system 100 may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the data retrieval module 816 and the captive portal registration module 822 may be implemented as firmware or as a state machine in hardware. For example, at least the data file validator 820 of the data retrieval module 816 may be implemented as an application specific integrated circuit (ASIC), a digital signal processor (DSP), or some combination thereof. As another example, the proxy management engine 826 may be implemented as a state machine using a field programmable gate array (FPGA).

As used in this disclosure, the term "a" or "one" may include one or more items unless specifically stated otherwise. Further, the phrase "based on" is intended to mean "based at least in part on" unless specifically stated otherwise.

What is claimed is:

1. A first device, comprising:
   at least one processor; and
   at least one memory comprising instructions that, when executed by the at least one processor, cause the first device to:
   receive, from a server, an indicator representing a second device can no longer communicate data with the server through a captive portal system, the second device being configured without an alphanumeric keyboard;
   receive, from the second device, captive portal login webpage data associated with the captive portal system;
   generate updated captive portal login webpage data including captive portal login credentials and first device identifying information; and
   send the updated captive portal login webpage data to the second device, the captive portal login credentials being usable by the captive portal system to re-authenticate the second device with the captive portal system.

2. The first device of claim 1, wherein the at least one memory further comprises instructions that, when executed by the at least one processor, further cause the first device to:
   output, via a speaker component of the first device, audio representing the second device can no longer communicate data with the server through the captive portal system; and
   at least partially contemporaneously with outputting the audio, present visual content representing the second device can no longer communicate data with the server through the captive portal system.

3. The first device of claim 1, wherein the at least one memory further comprises instructions that, when executed by the at least one processor, further cause the first device to:
   after receiving the indicator, determine that the first device was used to previously authenticate the second device with the captive portal system.

4. The first device of claim 1, wherein the at least one memory further comprises instructions that, when executed by the at least one processor, further cause the first device to:
   prior to receiving the indicator, receive, from the server, a second indicator representing when the second device is to be re-authenticated with the captive portal system.

5. The first device of claim 1, wherein the indicator includes captive portal network information and captive portal login information.

6. The first device of claim 1, wherein the at least one memory further comprises instructions that, when executed by the at least one processor, further cause the first device to:
   based at least in part on receiving indicator, establish a wireless connection with the second device.

7. The first device of claim 1, wherein the indicator includes service set identifier (SSID) information associated with the captive portal system.

8. The first device of claim 1, wherein the at least one memory further comprises instructions that, when executed by the at least one processor, further cause the first device to:
   after receiving the indicator, identify the second device using a local network to which the first device and the second device are both connected.

9. A method, executable by a first device, comprising:
   receiving, from a server, an indicator representing a second device can no longer communicate data with the server through a captive portal system, the second device being configured without an alphanumeric keyboard;
   receiving, from the second device, captive portal login webpage data associated with the captive portal system;
   generating updated captive portal login webpage data including captive portal login credentials and first device identifying information; and
   sending the updated captive portal login webpage data to the second device, the captive portal login credentials being usable by the captive portal system to re-authenticate the second device with the captive portal system.

10. The method of claim 9, further comprising:
    outputting, via a speaker component of the first device, audio representing the second device can no longer communicate data with the server through the captive portal system; and
    at least partially contemporaneously with outputting the audio, present visual content representing the second device can no longer communicate data with the server through the captive portal system.

11. The method of claim 9, further comprising:
    after receiving the indicator, determining that the first device was used to previously authenticate the second device with the captive portal system.

12. The method of claim 9, further comprising:
    prior to receiving the indicator, receiving, from the server, a second indicator representing when the second device is to be re-authenticated with the captive portal system.

13. The method of claim 9, wherein the indicator includes captive portal network information and captive portal login information.

14. The method of claim 9, further comprising:
    based at least in part on receiving the indicator, establishing a wireless connection with the second device.

15. The method of claim 9, wherein the indicator includes service set identifier (SSID) information associated with the captive portal system.

16. The method of claim 9, further comprising:
after receiving the indicator, identifying the second device using a local network to which the first device and the second device are both connected.

* * * * *